G. M. SHAFFER & E. A. FRANKLIN.
GASKET.
APPLICATION FILED JULY 9, 1913.
1,174,359.
Patented Mar. 7, 1916.
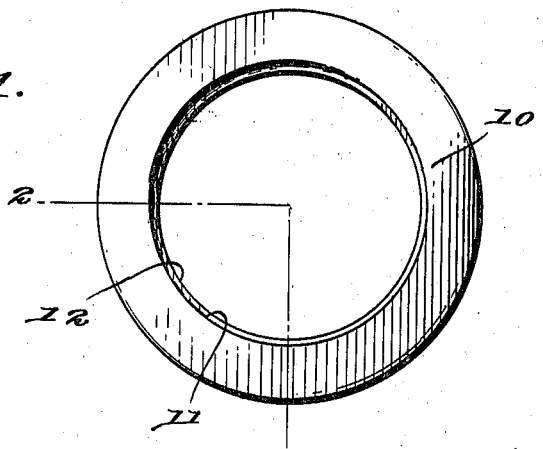
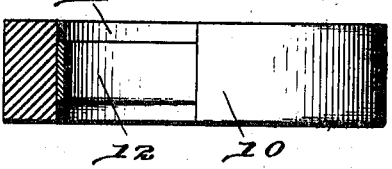
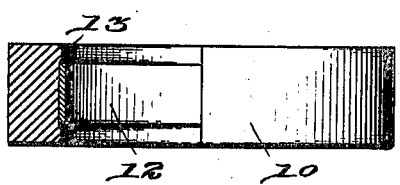
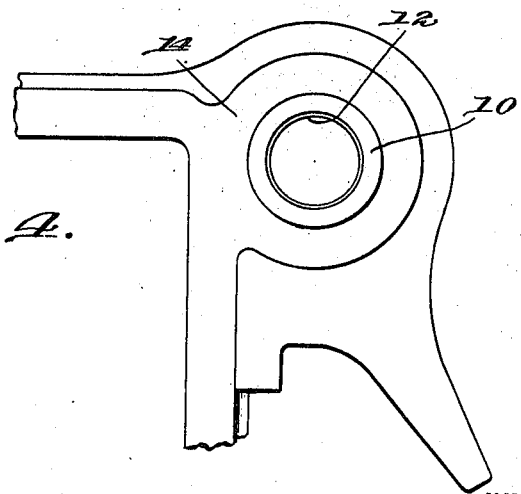
WITNESSES
INVENTORS
George M. Shaffer,
Emlen A. Franklin,
by Clark, Prentice & Clark, Attorneys.

UNITED STATES PATENT OFFICE.

GEORGE M. SHAFFER, OF DENVER, AND EMLEN A. FRANKLIN, OF FORT MORGAN, COLORADO.

GASKET.

1,174,359.  Specification of Letters Patent.  Patented Mar. 7, 1916.

Application filed July 9, 1913. Serial No. 778,043.

*To all whom it may concern:*

Be it known that we, GEORGE M. SHAFFER and EMLEN A. FRANKLIN, citizens of the United States, residing at Denver, in the county of Denver, and Fort Morgan, county of Morgan, respectively, State of Colorado, have invented new and useful Improvements in Gaskets, of which the following is a specification.

Our invention relates to gaskets, and has for its objects the production of such a device which will make a tight joint between the parts to be connected, which will withstand heavy pressure, and which will have a smooth, rigid and unbroken interior surface of great strength.

The gasket is designed for, and particularly applicable to, the joints between the plates of filter presses and other apparatus using such joints. In such structures yielding or resilient gaskets made of rubber or other suitable material are employed, such gaskets closing or expanding toward the center when compressed on the sides in making a joint. It has been found that in a short time, especially when the apparatus is used in the presence of heat, or hot liquid is pressed through the joint, the gasket will remain reduced in inside diameter and will no longer make a close joint between the adjacent surfaces, so that it must be replaced.

In carrying our invention into effect we provide a resilient annulus gasket preferably having a cylindrical inner surface or constant inside diameter, and an inner strengthening ring or band having an outside diameter substantially equal to the inner diameter of the annulus and forming a continuous and rigid support for the annulus when compressed. These and further details will more fully appear hereinafter.

The invention consists in the novel construction and arrangement of parts hereinafter described, and illustrated in the accompanying drawings, in which—

Figure 1 is a side view in elevation of the gasket; Fig. 2 is an edge view, partly in section on line 2—2 of Fig. 1; Fig. 3 is a view similar to Fig. 2, but showing the gasket compressed; and Fig. 4 is a side view of a portion of a filter press plate with the gasket in position.

Referring to the drawings, 10 is a resilient annulus or ring adapted to fit between the parts to be joined and having an inner cylindrical surface 11 throughout its width. This surface is spoken of, and shown, as cylindrical in this instance for the reason that the gasket is circular, but this is merely illustrative as the gasket may have any other shape. The main consideration is that the inner surface of the part 10 is longitudinally straight.

Fitting within annulus 10 is ring 12 of rigid material which is continuous or otherwise made rigid against inward pressure when the gasket is compressed. This ring 12 has an inner diameter and surface which is unchanged by the pressure put upon the gasket, and an outer diameter and surface substantially the same as the inner diameter of resilient annulus 10, so that it may be readily slipped within the latter. Ring 12 is made of less width than annulus 10, and is preferably spaced from each side or face thereof so as not to be engaged by the parts to be joined and to permit annulus 10 to be compressed. When compressed the inner surface of the annulus will expand inwardly upon each side of ring 12, as shown at 13 in Fig. 3, thus holding the ring in place. By this construction it will be seen that ring 12 takes most of the inward thrust of the resilient annulus, sustaining almost any pressure, and at the same time the inner surface of the annulus, which must be compressed inward to some extent, does not lessen the inner diameter of the gasket as a whole. A smooth inner surface is thus provided which will not obstruct the flow of liquid, and the gasket cannot be given a permanent enlarged inner diameter.

In Fig. 4 our improved gasket is shown applied to the plate 14 of a filter press. By this arrangement an efficient joint is effected.

We are aware that various changes may be made in details of construction without departing from the invention, and all such we aim to cover within the scope of the appended claims.

Having described our invention, what we claim as new and desire to secure by Letters Patent of the United States, is:—

1. A gasket comprising an outer compressible annulus having an inner cylindrical surface throughout its width, and a ring of rigid unyielding material of less width than the annulus, said ring having an outer cylindrical surface of the same diameter as said inner cylindrical surface of the annulus and spaced from each side thereof, whereby in use said ring prevents the inward distortion of the body of said annulus and the inner edges of said annulus are compressed on the edges of the ring and prevent displacement of the latter.

2. A gasket comprising an outer resilient annulus having an inner cylindrical surface throughout its width, a continuous unbroken ring of rigid unyielding material of less width than the annulus, said ring having an outer cylindrical surface of practically the same diameter as said inner cylindrical surface of the annulus and fitting within the same between and spaced from the outer faces thereof whereby when the gasket is compressed by heavy pressure the resilient annulus expands inwardly adjacent the edges of said ring but the inner diameter of the gasket remains unchanged.

In testimony whereof we have affixed our signatures in presence of two witnesses.

GEORGE M. SHAFFER.
EMLEN A. FRANKLIN.

Witnesses:
S. P. SAUNDERS,
W. D. LIPPITT.